United States Patent [19]
Koike

[11] 3,842,541
[45] Oct. 22, 1974

[54] WINDOW REGULATOR MECHANISM FOR A VEHICLE
[75] Inventor: Shoichi Koike, Tokyo, Japan
[73] Assignee: Nissan Motor Company, Limited, Yokohama City, Japan
[22] Filed: July 5, 1973
[21] Appl. No.: 376,388

[30] Foreign Application Priority Data
July 6, 1972 Japan.............................. 47-79198
July 6, 1972 Japan.............................. 47-49199

[52] U.S. Cl..................................... 49/227, 49/40
[51] Int. Cl............................................ E05f 11/52
[58] Field of Search.......... 49/227, 40, 41, 348–353, 49/211

[56] References Cited
UNITED STATES PATENTS
| 2,848,218 | 8/1958 | Leslie et al. | 49/349 |
| 2,969,977 | 1/1961 | Himka | 49/211 |
| 3,072,395 | 1/1963 | Pickles | 49/351 X |
| 3,398,488 | 8/1968 | Garvey | 49/227 X |

FOREIGN PATENTS OR APPLICATIONS
514,574  7/1955  Canada................................ 49/227

Primary Examiner—Kenneth Downey

[57]  ABSTRACT

An arm and guiding mechanism which raises and lowers a curved window pane, the portion of the arm which engages the window pane moving in a path substantially parallel to the curvature of the window pane.

8 Claims, 12 Drawing Figures

Fig. 6
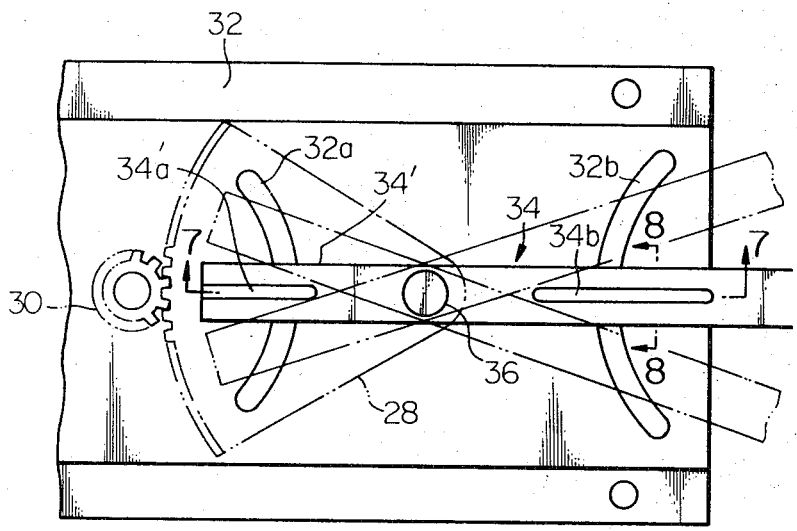
Fig. 7
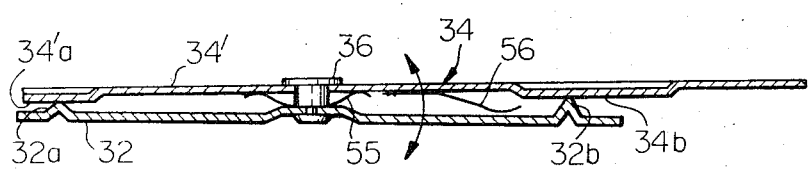
Fig. 8

WINDOW REGULATOR MECHANISM FOR A VEHICLE

This invention relates in general to window regulators for motor vehicles and, more particularly, to a window regulator mechanism which controls the movement of a vehicle window pane in a predetermined manner.

It is a principal object of the present invention to provide an improved window regulator mechanism for a motor vehicle which is particularly suitable for use with a window pane having vertical or compound curvature, but which is not limited thereto.

It is another object of the present invention to provide a window regulator mechanism which smoothly raises and lowers a vehicle window pane.

It is another object of the present invention to provide a window regulator mechanism for smoothly controlling the movement of a vehicle window pane without the use of complicated tracks and guideways.

It is still another object of the present invention to provide a window regulator mechanism for regulating the movement of a vehicle window pane having vertical or compound curvature through a relatively narrow window pane passageway which may have conventional weather stripping.

It is still another object of the present invention to provide a window regulator mechanism which assures stability of movement of a vehicle window pane.

It is a further object of the present invention to provide a window regulator mechanism which is simple in construction, involves very few parts, and is therefore less expensive to manufacture and easier to install in an existing motor vehicle door without significant modification or change than mechanisms heretofore known and used.

These and other objects and features of the present invention will become more apparent from the following description when taken in conjunction with the accompanying drawings, in which:

FIG. 6 is a plan view illustrating an essential part of one embodiment of a window regulator mechanism according to the present invention;

FIG. 7 is a sectional enlarged view taken on a line 7—7 in FIG. 6;

FIG. 8 is a sectional enlarged view taken on a line 8—8 of FIG. 6;

Figure 1:
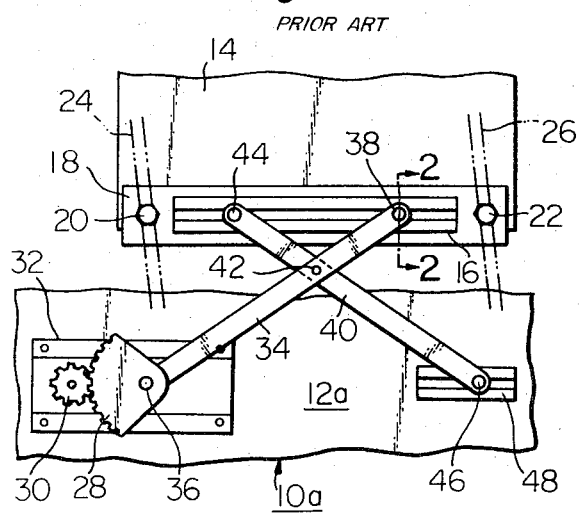
FIG. 1 is a diagrammatic view showing an example of a typical window regulator mechanism to which the present invention is directed.
Figure 2:
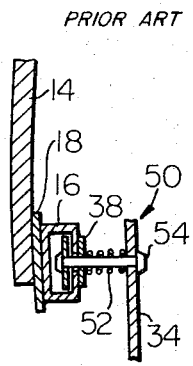
FIG. 2 is a sectional enlarged view taken on a line 2—2 of FIG. 1.
Figure 3:
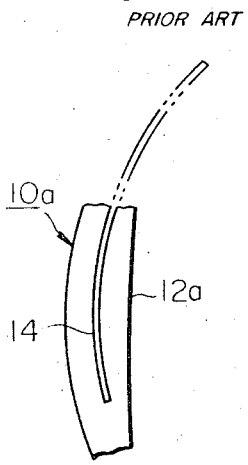
FIG. 3 is a sectional view illustrating a vehicle door receiving therein a window pane.

Referring now to FIGS. 1 and 2, there is shown a window regulator mechanism to which the present invention is directed. The window regulator mechanism proposed by the present invention is specifically suited for use in a motor vehicle. The motor vehicle is herein shown as including a vehicle door body 10a having a door inner panel 12a. As best seen in FIG. 3, a window pane 14 is disposed within the vehicle door boty 10a and is movable upwards or downwards by means of a window regulator mechanism within the vehicle door body 10a.

The window regulator mechanism includes a guide rail 16 to which the window pane 14 is attached by a supporting plate 18, which is secured to the window pane 14 by some suitable fastening means (not shown). A pair of rollers 20 and 22 are mounted on the supporting plate 18 at both ends thereof. These rollers 20 and 22 are rollably disposed in vertical guideways 24 and 26, respectively, which are secured to the door inner panel 12a for vertically guiding the window pane 14 between open and closed positions.

The window regulator mechanism also includes a driving means such as a sector gear 28 and a cooperating pinion gear 30 operated by a crank handle or other suitable means not shown. As shown, the pinion gear 30 is rotatably mounted on a base plate 32 which is attached to the door inner panel 12a by a known suitable means.

The sector gear 28 is fixedly connected to one end of a regulator arm 34 which is connected to and rotatable around a pivot shaft 36 mounted on the base plate 32. The regulator arm 34 is provided at its other end with a guide roller 38 which is rollably received in the guide rail 16. This regulator arm 34 is pivotally connected to an auxiliary regulator arm 40 by a pin 42 at a point spaced from the pivot shaft 36 mounted on the base plate 32. One end of the auxiliary regulator arm 40 carries thereon a guide roller 44 which is rollably received in the guide rail 16 attached to the window pane 14. A guide roller 46 carried on the other end of the regulator arm 40 is rollably received in an auxiliary guide rail 48 which is attached to the door inner panel 12 by some suitable means, though not shown. As seen in FIG. 1, the auxiliary guide rail 48 is positioned parallel to the guide rail 16 which horizontally extends as previously mentioned.

With the configuration mentioned hereinabove, if the crank handle (not shown) is rotated, then the pinion gear 30 rotates thereby rotating the sector gear 28 about the pivot shaft 36. This causes the regulator arm 34 to rotate about the pivot shaft 36. During this rotational movement, the guide roller 38 carried on the far end of the regulator arm 34 moves within the guide rail 16, thereby applying a force to the guide rail 16 to raise or lower the window pane 14. The guide roller 44 mounted on the far end of the auxiliary regulator arm 40 also moves therein and the roller 46 carried on the other far end of the regulator arm 40 moves within the auxiliary guide rail 48. Since, in this instance, the guide rails 16 and 48 are positioned parallel to each other, the window pane 14 connected to the guide rail 16 is vertically raised or lowered.

It will be noted that, during operation of the window regulator mechanism, the end of the regulator arm 34 carrying thereon the guide roller 38 moves upwards or downwards in a substantially vertical plane, thereby causing difficulty in producing smooth raising and lowering of the window pane 14, especially if the window pane 14 has vertical or compound curvature. To eliminate this difficulty, it has heretofore been proposed to provide a compensating means in the window regulator mechanism.

As best shown in FIG. 2, a prior art compensating means which is generally designated by a reference numeral 50 includes a spring 52, which is disposed between the guide roller 38 and the regulator arm 34 for biasing the guide roller 38 away from the regulator arm 34. The guide roller 38 is slidably mounted on a pin 54 secured to the regulator arm 34 so as to compensate for variations in clearance between the guide rail 16 and the end of the regulator arm 34 during operation of the window regulator mechanism. A similar compensating mechanism is also provided on the end of the auxiliary regulator arm 40 to effect smooth movement of a window pane having vertical or compound curvature. These compensating mechanisms are advantageous in that the window pane is smoothly raised and lowered if the window pane has a relatively large radius of curvature. If, however, the window pane has a relatively small radius of curvature, difficulty is encountered even with a window regulator mechanism equipped with such compensating mechanisms in that it is difficult to obtain ease of movement of the window pane and stability of the window pane in the course of movement. This is more clearly explained with reference to FIGS. 4 and 5 of the accompanying drawings.

Figure 4:
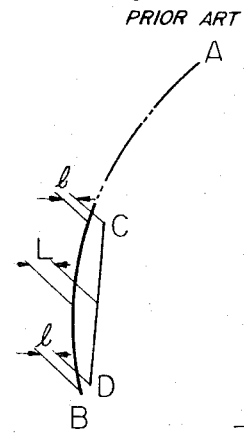
FIGS. 4 and 5 are views illustrating the relationship between the movement of a vehicle window pane and the locus of one point on a window regulator arm.
Figure 5:
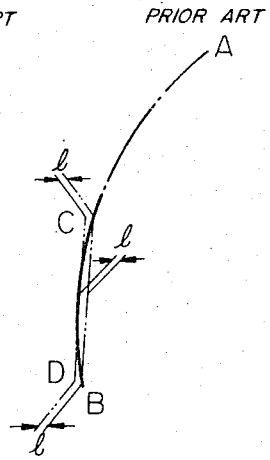

In FIGS. 4 and 5, a character A represents the upper limiting point of movement of the window pane 14, and a character B represents the lower limiting point of movement of the window pane 14. It is to be understood that the arc A-B corresponds to the path of the window pane 14. In addition, a character C represents the upper limiting point of movement of the end of the regulator arm 34 carrying the guide roller 38, while a character D represents the lower limit of the same. The arc C-D indicates the path of the end of the regulator arm 34. If the window regulator mechanism is arranged such that the end of the regulator arm does not intersect the path A-B in FIG. 4, the clearance between the end of the regulator arm and the window pane will vary to a significant extent from, for example, a distance $l$ to a distance L. With this arrangement, since there is a significant variation in clearance between the end of the regulator arm and the window pane, the compensating mechanism proposed in the prior art can not fully compensate. Under these conditions, the regulator arm is bent to produce a loading between the window pane and the regulator arm so that it is difficult to smoothly rotate the crank handle for the pinion gear. On the contrary, where the window regulator mechanism is arranged such that the end of the regulator arm intersects the travelling path A-B in FIG. 5 so as to equalize the $l'$ between the end of the regulator arm and the window pane at various positions of the end of the regulator arm, undesirable bending of the regulator arm is prevented. However, the window pane is shifted the right and left as viewed in FIG. 5 to cause unstable movement of the window pane. This is also reflected by unusual wear of wather seal strips mounted at the window pane opening of the vehicle door structure.

The present invention contemplates to provide an improved window regulator mechanism in which a regulator arm has an end which moves in a path substantially parallel to the curvature of the window pane for thereby producing smooth movement of the window pane between open and closed positions.

A preferred embodiment of a window regulator mechanism producing the above-mentioned desired effect is illustrated in FIGS. 6, 7 and 8, wherein like or corresponding component parts are designated by the same reference numerals as those used in FIG. 1. In this illustrated embodiment, the regulator arm 34 is rotatably supported on the base plate 32 by means of the pivot pin 36, and a spring washer 55 is interposed between the regulator arm 34 and the base plate 32 about the pivot pin 36 to allow stable rotational movement of the regulator arm 34 and to maintain the height of the pivoting point constant. As best seen in FIG. 6, the base plate 32 is formed at a position between the operating edge of the pinion gear 30 and the pivot pin 36 with a curved guide ridge 32a which constitutes an important feature of the present invention. It should be noted that the height of the guide ridge is less than that of the pivoting point relative to the base plate for the other end of the regulator arm to move in a path of the window pane curvature. According to another important feature of the present invention, the regulator arm 34 has an extension 34' which extends over the curved guide ridge 32a formed on the base plate 32, and has a sliding surface 34'a slidably engaging with the curved ridge 32a. As seen in FIG. 8, the sliding surface 34'a may be formed on a ridge (no numeral) provided on the extension 34' of the regulator arm 34.

The base plate 32 may further include an additional curved guide ridge 32b, and which is shown as having a greater height than that of the curved guide ridge 32a. The guide ridges 32a and 32b have the general shapes of annular segments, and are shown as being oriented such that their centers of curvature are located to their left and right respectively as shown in FIG. 6. It should be noted that the curved guide ridges 32a and 32b may be modified in accordance with the curvature of the window pane. It should also be understood that the curved guide ridges 32a and 32b may be separately formed from and joined to the base plate 32 by using a low friction material such as polyamide or polytetrafluoroethylene. The regulator arm 34 may further have formed thereon an additional sliding surface 34b which slidably engages with the additional curved ridge 32b formed on the base plate 32. It should be appreciated that the sliding surfaces 34'a and 34b may be coated with a low friction material such as polyamide or polytetrafluoroethylene, whereby the sliding surfaces 34'a and 34b slide in smooth contact with the curved ridges 32a and 32b, respectively.

With the arrangement mentioned hereinbefore, since the curved ridges 32a and 32b are radially reversed from each other, and the curved ridge 32b is slightly higher than the curved ridge 32a, the distance between the sliding contact point of the sliding surface 34'a with respect to the curved ridge 32a and the sliding contact point of the sliding surface 34b with respect to the additional curved ridge 32b varies in accordance with the angular position of the regulator arm 34. Thus, the above-noted distances will be greater if the end of the regulator arm 34 is held at its uppermost or lowermost limit that if the end of the regulator arm is held at an intermediate position. In FIG. 6, a solid figure shows the regulator arm 34 at an intermediate position while phantom figures indicate the regulator arm 34 at its uppermost and lowermost positions. From this it will be seen that during rotation of the regulator arm 34, the end thereof will move in a curved path. It is accordingly understood that by appropriately determining the configuration, position, and height of the curved guide ridges 32a and 32b, respectively, the end of the regulator arm 34 and the guide roller 38 (see FIG. 1) will move in a path substantially parallel to the curvature of the window pane 14 (see FIG. 1).

In a modified form of a window regulator mechanism according to the present invention, a leaf spring 56, which is shown in phantom in FIG. 7 can be disposed between the regulator arm 34 and the base plate 32. The leaf spring 56 has one end secured to the regulator arm 34 and the other end slidably engaging with the base plate 32. In this modification, the additional curved guide ridge 32b can be dispensed with, because the leaf spring 56 has the same function as the curved guide ridge 32b.

Figure 9:
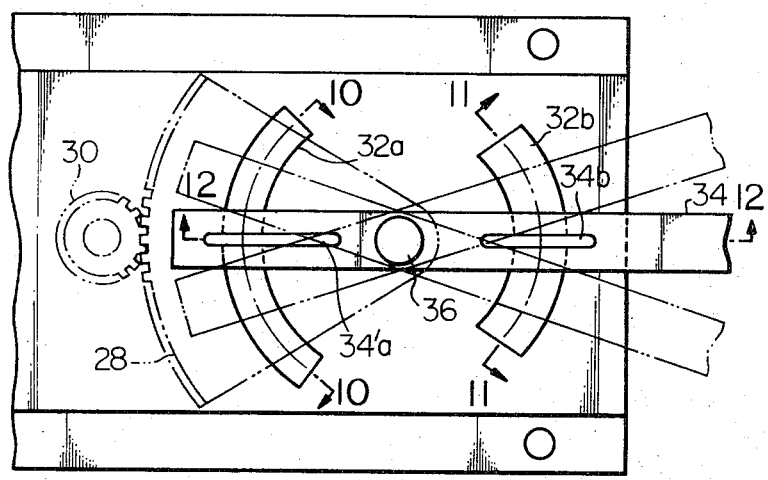
FIG. 9 is a plan view illustrating an essential part of another embodiment of a window regulator mechanism according to the present invention.
Figure 10:
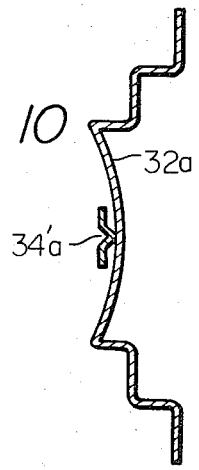
FIG. 10 is a sectional enlarged view taken on a line 10—10 of FIG. 9.
Figure 11:
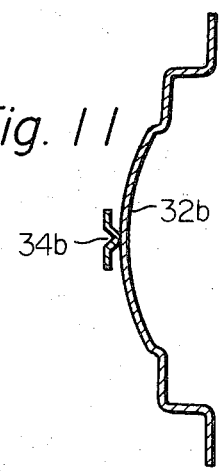
FIG. 11 is a sectional enlarged view taken on a line 11—11 of FIG. 9.
Figure 12:
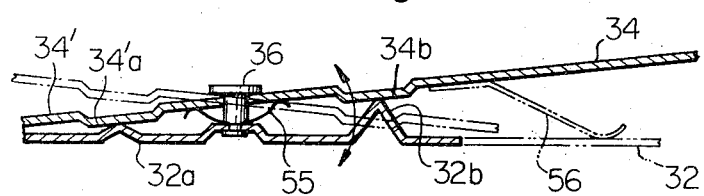
FIG. 12 is a sectional enlarged view taken on a line 12—12 of FIG. 9.

A modified form of a window regulator mechanism according to the present invention is illustrated in FIGS. 9 to 12, wherein like or corresponding component parts are designated by the same reference numerals as those used in FIGS. 6 and 7. In this illustrated embodiment, the guide ridges 32a and 32b have the general shape of annular arcs segments, and are oriented such that their centers of curvature are located between them as shown in FIG. 9. The modified embodiment shown in FIGS. 9 to 12 also differs from the above embodiment in that the height of the guide ridge 32a varies along its arc in a generally concave manner as seen in FIG. 10, while the height of the guide ridge 32b varies along its arc in a generally convex manner as shown in FIG. 11. With this modification, the end of the regulator arm 34 moves in a path precisely parallel to the curvature of the window pane of the motor vehicle, so that there will be no undesirable loading on the regulator arm, whereas unstable movement of the window pane is prevented and, thus, the window pane is smoothly raised and lowered with less operator effort.

It will now be understood from the foregoing description that the window regulator mechanism according to the present invention enables smooth raising and lowering of the window pane without impairing the operation of the crank handle of the mechanism.

It will also be noted that the window regulator mechanism of the present invention can be readily manufactured merely by incorporating the feature of the present invention into an existing window regulator mechanism.

It will further be appreciated that the window regulator mechanism of the present invention is simple in construction and inexpensive to manufacture.

While, in the illustrated embodiments, the window regulator mechanism according to the present invention has been shown and described as having a sliding contact surface which is provided on an extension of a main regulator arm and which engages a guide ridge, it should be born in mind that the sliding contact surface may be formed on a sector gear so as to be held in sliding contact with the guide ridge and that the sector gear is fixedly secured to an end of the regulator arm.

What is claimed is:

1. A window regulator mechanism for raising and lowering a curved window pane of a motor vehicle having a door inner panel, comprising a horizontally extending guide rail attached to said window pane, a horizontally extending auxiliary guide rail attached to said door inner panel, a base plate attached to said door inner panel, a regulator arm pivotally connected at its one end to said base plate through a pivot shaft mounted on said base plate and carrying at its other end guide roller rollably received in said guide rail, said regulator arm including an extension having a sliding surface, an auxiliary regulator arm pivotally connected to said regulator arm and carrying at its both ends guide rollers rollably received in said guide rail and said auxiliary guide rail respectively, driving means mounted on said base plate and operatively connected to the one end of said regulator arm for actuating the same to raise and lower said window pane, and a guide ridge provided on said base plate between said pivot shaft and said driving means and having the general shape of an annular segment, a spring washer disposed between said regulator arm and said base plate about said pivot shaft, said spring washer holding said regulator arm at a height from said base plate, at the pivot connection thereto, which is different from the height of said guide ridge, the sliding surface of said extension of said regulator arm being held by said spring washer in sliding contact with said guide ridge, whereby the distance between the center of said pivot shaft and a point of sliding contact between said sliding surface of said extension and said guide ridge varies in dependence on the angular position of said regulator arm, and the other end of said regulator arm moves in a path substantially parallel to the curvature of said window pane.

2. A window regulator mechanism as claimed in claim 1, in which said regulator arm has an additional sliding surface formed thereon between said pivot shaft and said guide roller carried at the other end of said regulator arm, and further comprising an additional guide ridge provided on said base plate on the other side of said pivot shaft and having the general shape of an annular segment, said additional guide surface formed on said regulator arm being in sliding contact with said additional guide member provided on said base plate.

3. A window regulator mechanism as claimed in claim 1, further comprising a leaf spring disposed between said regulator arm and said base plate at a position between said pivot shaft and the other end of said regulator arm, said leaf spring having one end secured to said regulator arm and the other end slidably engaging with said base plate.

4. A window regulator mechanism as claimed in claim 2, in which each of said guide ridges is integrally formed on said base plate.

5. A window regulator mechanism as claimed in claim 2, in which each of said guide ridges is separately formed from and joined to said base plate.

6. A window regulator mechanism as claimed in claim 5, in which said guide ridges are made from a low friction material.

7. A window regulator mechanism as claimed in claim 2, in which said guide ridges are radially reversed from each other and said additional guide ridge has a uniform height higher than that of said guide member.

8. A window regulator mechanism as claimed in claim 2, in which said guide ridge and said additional guide ridge are oriented such that their centers of curvature are located therebetween, and wherein said guide ridge has a control surface which varies in height along its arc in a substantially concave manner, whereas said additional guide member has a control surface which varies in height along its arc in a generally convex manner.

* * * * *